United States Patent
Aoki et al.

[11] Patent Number: 5,853,347
[45] Date of Patent: Dec. 29, 1998

[54] CONTINUOUSLY VARIABLE V-BELT TRANSMISSION

[75] Inventors: Takashi Aoki; Keiichi Hanyu; Hideaki Yoshida, all of Saitama-ken, Japan

[73] Assignee: Honda Giken Kogyo Kabushiki Kaisha, Tokyo, Japan

[21] Appl. No.: 694,706

[22] Filed: Aug. 9, 1996

[30] Foreign Application Priority Data

Aug. 10, 1995 [JP] Japan .................................... 7-204919

[51] Int. Cl.⁶ ........................................................ F16H 9/00
[52] U.S. Cl. ................................................. 477/45; 477/48
[58] Field of Search ................................ 477/44, 45, 48

[56] References Cited

U.S. PATENT DOCUMENTS

| | | | |
|---|---|---|---|
| 4,718,306 | 1/1988 | Shigematsu et al. | 477/45 |
| 4,841,814 | 6/1989 | Satoh | 477/45 |
| 4,893,526 | 1/1990 | Tokoro | 477/45 X |
| 5,042,325 | 8/1991 | Sawasaki et al. | 477/45 |
| 5,218,541 | 6/1993 | Sakakibara et al. | 477/44 X |
| 5,243,881 | 9/1993 | Hayashi . | |
| 5,259,272 | 11/1993 | Yamamoto et al. | 477/45 |
| 5,305,662 | 4/1994 | Togai et al. | 477/43 |
| 5,382,205 | 1/1995 | Togai et al. | 477/43 |
| 5,573,478 | 11/1996 | Tsukamoto et al. | 477/150 X |

FOREIGN PATENT DOCUMENTS 6-288448  10/1994  Japan .

*Primary Examiner*—Dirk Wright
*Assistant Examiner*—Peter T. Kwon
*Attorney, Agent, or Firm*—Nikaido, Marmelstein, Murray & Oram LLP

[57] ABSTRACT

A continuously variable V-belt transmission includes a lateral pressure control valve for controlling the lateral pressures of a drive pulley and a driven pulley, and a controller for controlling the lateral pressure control valve. The controller calculates a target belt transmission torque by adding a predetermined marginal torque to a transmission torque calculated based on a signal detected from a driving condition of a vehicle, and obtains, by means of a signal converter, a control signal for controlling the lateral pressure control valve. With this arrangement, it becomes possible to prevent slippage between the belt and pulleys and to produce a most appropriate clamping force even when the lateral pressure control oil pressure is varied due to secular and environmental changes in the pulley lateral pressure control valve, whereby the transmission is rendered durable, efficient in fuel consumption and highly reliable.

3 Claims, 9 Drawing Sheets

CONTINUOUSLY VARIABLE V-BELT TRANSMISSION

BACKGROUND OF THE INVENTION

1. Field of the Invention

The present invention relates to a continuously variable V-belt transmission (CVT) for causing a desired belt transmission torque to act upon a V-belt while preventing slippage of the belt.

2. Description of the Related Art

A continuously variable V-belt transmission transmits motive power through the frictional contact between groove-defining side surfaces of a drive pulley or a driven pulley and side surfaces of a V-belt. Therefore, the pulleys are required to have sufficient clamping force with respect to the the belt. When the clamping force is insufficient, the belt experiences slippage, thus resulting in deterioration of the transmission of the motive power and in significant damage of the contact surfaces. As the clamping force becomes excessive, this may deteriorate the fuel consumption efficiency and durability of the belt.

The foregoing phenomena associated with insufficient and excessive clamping forces are commonly experienced in a metal belt CVT, a chain CVT, and a rubber belt CVT. Therefore, a continuously variable transmission requires pulley lateral pressure control for maintaining the clamping force at a most appropriate level.

To this end, there has been proposed by the present inventors a "Continuously Variable V-Belt Transmission" as disclosed in Japanese Patent Laid-Open Publication No. HEI 6-288448. The transmission comprises an actual transmission torque computing device for computing an actual transmission torque transmitted via a V-belt, a belt transmission torque computing device for computing a belt transmission torque by multiplying the computed actual transmission torque by a predetermined safety factor, and lateral pressure control valves for controlling the lateral pressure control oil pressure for driving a drive pulley and a driven pulley based on the belt transmission torque.

Since the belt transmission torque computing device is adapted to produce the belt transmission torque by multiplying the computed actual transmission torque by a predetermined safety factor, the pulleys are supplied with a desired lateral pressure control oil pressure.

In the above continuously variable V-belt transmission, since the actual transmission torque is multiplied by a predetermined value of safety factor for determining a belt transmission torque which in turn determines the lateral pressure control oil pressure, the belt transmission torque increases/decreases in response to the increase/decrease of the actual transmission torque where the safety factor is maintained the same. Thus, a marginal torque (corresponding to a marginal oil pressure of the lateral pressure control oil pressure) of the belt transmission torque for preventing slippage of the V-belt is apt to be small on a low load OD (Over-Drive) ratio side of the CVT and to be large on a high load LOW ratio side.

Regulation of the lateral pressure control oil pressure corresponding to the belt transmission torque is effected by, for example, supplying a solenoid current corresponding to a belt transmission torque, to a proportional magnet valve (linear solenoid) for controlling the lateral pressure control valve to thereby regulate the valve-opening ratio. Although the lateral pressure control oil pressure is in proportion (or inverse proportion) to the solenoid current, dispersion is generated in the low load OD ratio side.

Typically, such dispersion of the lateral pressure control oil pressure in the low load OD ratio side (upon low lateral pressure) may be hysteresis of the lateral pressure control oil pressure relative to the solenoid current by the friction of the axle of the proportional magnet valve. There is also dispersion arising due to the structure of the lateral pressure control valve and dispersion arising due to the changes in oil conditions (temperature characteristics, etc.). Moreover, torque changes or variations are substantial under transitional conditions during a low load, and errors are likely to occur.

If dispersion occurs when the marginal torque of the belt transmission torque in the low load OD ratio side is small and the marginal oil pressure of the lateral pressure control oil pressure is also small, the V-belt undergoes slippage.

At the high load LOW ratio side (during a high lateral pressure), transitional changes in the engine torque are little, torque detection precision is high, and dispersion of hysteresis of control oil pressure is substantially constant irrespective of the magnitude of the oil pressure. Thus, high torque detection precision is ensured during a high lateral pressure. However, if the safety factor is set to prevent slippage of the V-belt in correspondence with the dispersion in the low load OD ratio side, the marginal oil pressure and hence the clamping force become too large, thus resulting in deterioration of the fuel consumption efficiency and shortened life of the belt.

SUMMARY OF THE INVENTION

It is therefore an object of the present invention to provide a continuously variable V-belt transmission which is durable, excellent in fuel consumption efficiency and capable of producing a most appropriate clamping force even when the lateral pressure control oil pressure is varied due to secular and environmental changes of a pulley lateral pressure control valve.

According to the present invention, there is provided a continuously variable V-belt transmission comprising a target transmission torque calculator which is composed of a marginal torque setting device for setting a marginal torque of predetermined value and a calculator for calculating a target transmission torque by adding the marginal torque to the transmission torque.

With the transmission thus arranged, it becomes possible to generate a most appropriate lateral pressure control oil pressure based on the target transmission torque, to prevent slippage of the V-belt in the low load OD ratio side and to provide a most appropriate clamping force in the high load LOW ratio side.

BRIEF DESCRIPTION OF THE DRAWINGS

A preferred embodiment of the present invention will hereinafter be described in greater detail with reference to the accompanying drawings, in which.

DETAILED DESCRIPTION OF THE PREFERRED EMBODIMENTS

Figure 1:
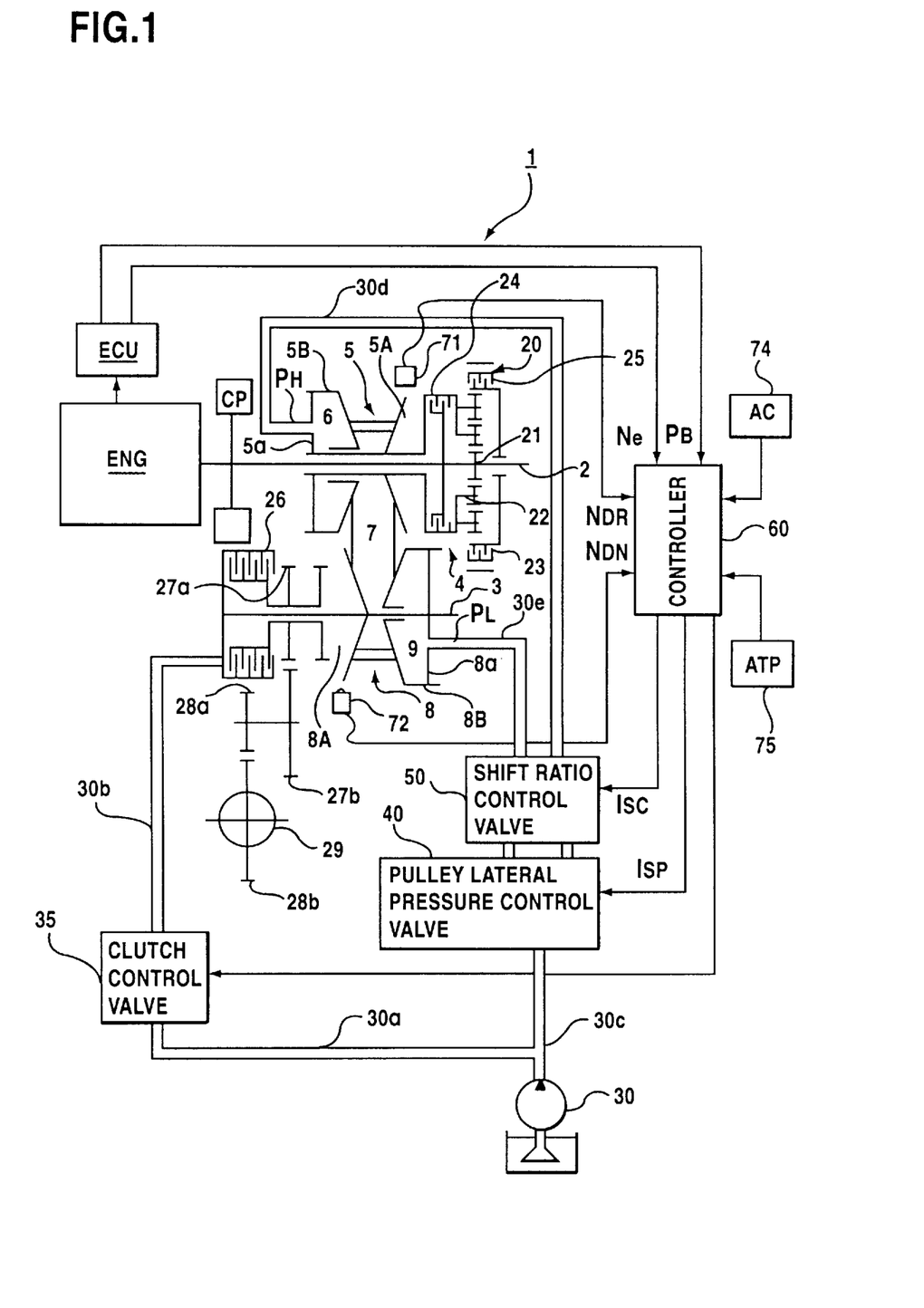
FIG. 1 is a diagrammatic view of a continuously variable V-belt transmission according to one embodiment of the present invention.

Referring initially to FIG. 1, there is diagrammatically shown a continuously variable V-belt transmission (hereinafter referred to as CVT) 1 according to the present invention. The CVT 1 includes a metal V-belt mechanism 4 disposed between an input shaft 2 and a counter shaft 3, a forward-backward drive shifting mechanism 20 comprised of a double pinion planetary gear disposed between the input shaft 2 and a drive pulley 5, and a startoff clutch 26 disposed between the counter shaft 3 and an output member (differential mechanism) 29.

The CVT 1 further includes an oil pressure pump 30, a clutch control valve a pulley lateral pressure control valve 40, a shift ratio control valve 50, a plurality of oil passages 30a–30e for supplying an oil pressure to the startoff clutch 26, and to the metal V-belt mechanism 4 and a controller 60 designed to execute a predetermined calculation, conversion and processing based on a signal ($N_e$, $P_B$) output from an electronic control unit (ECU) and a signal ($N_{DR}$, $N_{DN}$) output from revolution sensors 71, 72, described below, and so forth, so as to generate a control signal.

The CVT 1 is designed for use on a vehicle. The input shaft 2 is connected to an output shaft of an engine (ENG) by means of a coupling mechanism CP. The motive power transmitted to the differential mechanism 29 is transmitted to right and left wheels not shown.

The metal V-belt mechanism 4 is comprised of the drive pulley 5 disposed on the input shaft 2, a driven pulley 8 disposed on the counter shaft 3, and a metal V-belt 7 passing over the drive pulley 5 and the driven pulley 8.

The drive pulley 5 is comprised of a stationary pulley half 5A rotatably disposed on the input shaft 2 and a movable pulley half 5B axially movable toward and away from the stationary pulley half 5A. The movable pulley half 5B is provided with a drive side cylinder chamber 6 sealingly defined by a cylinder wall 5a connected to the stationary pulley half 5A. The lateral pressure for axially moving the movable pulley half 5B is generated by an oil pressure supplied to the drive side cylinder chamber 6 through the oil passage 30d.

The driven pulley 8 is comprised of a stationary pulley half 8A disposed on the counter shaft 3 and a movable pulley half 8B axially movable toward and away from the stationary pulley half 8A. The axially movable pulley half 8B has a driven side cylinder chamber 9 sealingly defined by a cylinder wall 8a connected to the stationary pulley half 8A. The lateral pressure for axially moving the movable pulley half 8B is generated by an oil pressure supplied to the driven side cylinder chamber 9 through the oil passage 30e.

By controlling the oil pressure (pulley lateral pressure control oil pressure) supplied to the drive side cylinder chamber 6 and the driven side cylinder chamber 9 to be kept at a desired value, it becomes possible to establish a pulley lateral pressure which does not cause slippage of the metal V-belt 7 and to effect the alteration of the widths of the drive pulley 5 and driven pulley 8. Thus, it becomes possible to phaselessly or continuously alter the reduction or shift ratio of the transmission 1 by continuously altering the radius of winding of the metal V-belt 7 around the drive pulley 5 and driven pulley 8 while appropriately maintaining the clamping force with respect to the metal V-belt 7 and drive pulley 5, or the metal V-belt 7 and driven pulley 8.

The planetary-gear forward-rearward drive shift mechanism 20 is comprised of a sun gear 21 connected to the input shaft 2, a carrier 22 connected to the stationary pulley half 5A, a ring gear 23 capable of being fixedly supported by a rearward drive brake 25, and a forward drive clutch 24 adapted to connect the sun gear 21 and the ring gear 23.

When the forward drive clutch 24 becomes engaged, the sun gear 21, carrier 22 and the ring gear 23 rotate in unison with the input shaft 2, whereby the the drive pulley 5 is driven in the same direction (direction of forward drive or propulsion) as the input shaft 2.

Upon engagement of the rearward drive brake 25, the ring gear 23 is driven in an opposite direction from the sun gear 21, whereby the drive pulley 5 is driven in an opposite direction (direction of rearward drive or propulsion) from the input shaft 2.

The startoff clutch 26 is designed for controlling the motive power transmission between the counter shaft 3 and an output side member and thus effects the motive power transmission therebetween upon engagement thereof. Thus, upon engagement of the startoff clutch 26, the engine output gone through the reduction via the metal V-belt mechanism 4 is transmitted through the gears 27a, 27b, 28a and 28b to the differential mechanism 29 by which the output is further transmitted dividedly to right and left wheels not shown. When the startoff clutch 26 is disengaged, the CVT 1 is placed in a neutral position since the motive power transmission is not effected.

Actuation control of the startoff clutch 26 is effected by a signal supplied from a controller 60 to a clutch control valve 35. Specifically, it is achieved by supplying an actuation oil pressure from the clutch control valve 35 to the startoff clutch 26 via the oil passage 30a and oil passage 30b.

The controller 60 inputs an engine revolution number $N_e$ signal and an engine intake negative pressure $P_B$ signal output from the electronic control unit (ECU) for controlling operation of the engine (ENG). Additionally, it inputs a signal output from an air-conditioner actuation detector 74 for detecting the actuation of an air-conditioner (AC) and a signal output from a shift range position detector 75 for detecting a shift range position based on a shift lever position (ATP).

The lateral pressure control valve, which is composed of the pulley lateral pressure control valve 40 and the shift ratio control valve 50, is designed for controlling the oil pressure (pulley lateral pressure control oil pressure $P_L$, $P_H$) supplied to the drive side cylinder chamber 6 and the driven side cylinder chamber 9 based on a control signal (solenoid current $I_{SC}$, $I_{SP}$) supplied from the controller 60.

Figure 2:
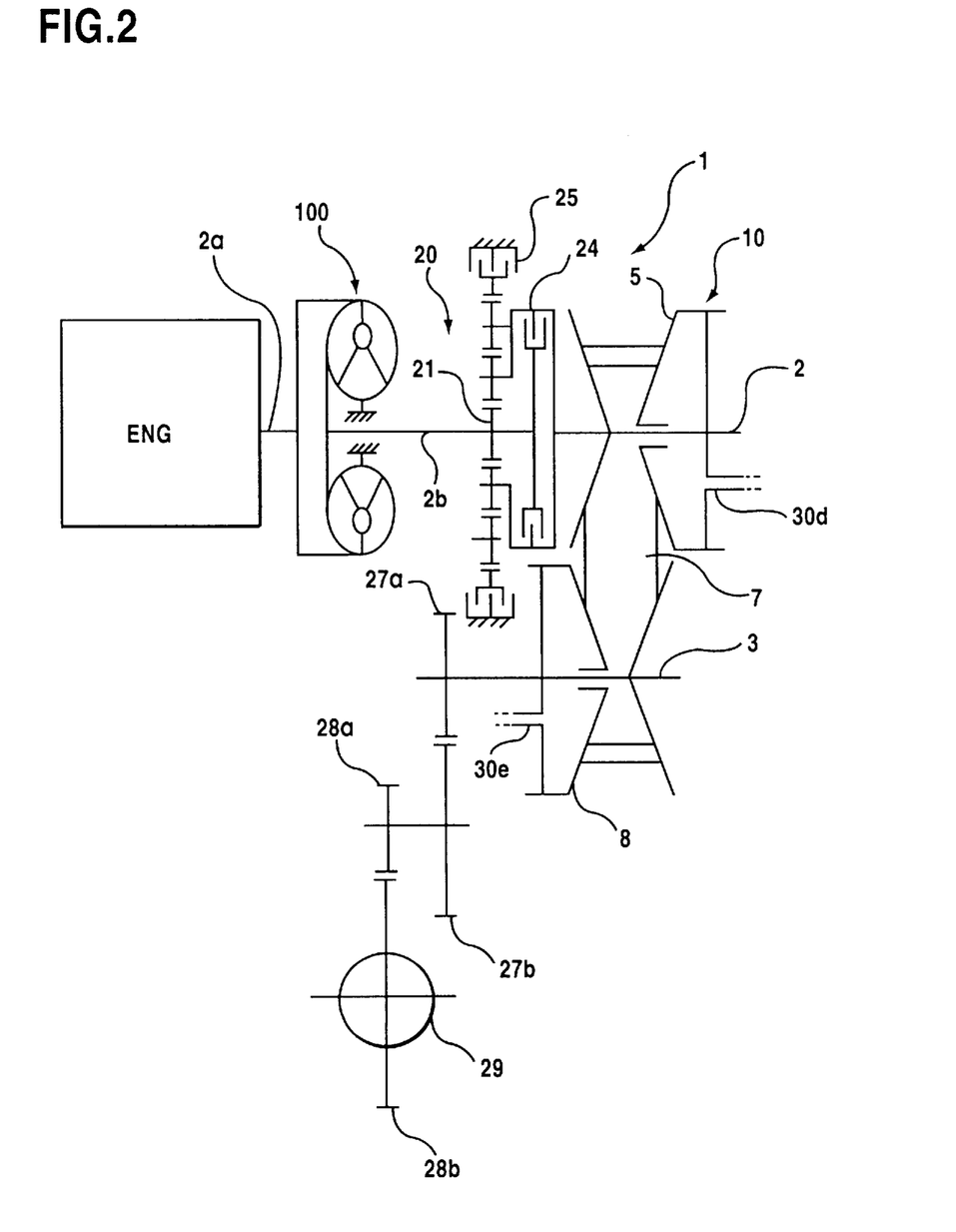
FIG. 2 is a diagrammatic view of an example continuously variable V-belt transmission having a torque converter.

FIG. 2 illustrates as an example a continuously variable V-belt transmission having a torque converter. It can be readily appreciated that the present invention can also be applied to a CVT 1 of such type.

The torque-converter-equipped CVT 1 is comprised of a torque converter 100 connected to an engine output shaft 2a, a forward-rearward drive shifting mechanism 20 having a double-pinion planetary gear connected to the output shaft 2a, and a continuously variable transmission mechanism 10 connected to the forward-rearward drive shifting mechanism 20. The forward-rearward drive shifting mechanism 20, which is connected to the turbine shaft 2b of the torque converter 100, has a forward drive clutch 24 and a rearward drive brake 25. The forward drive clutch 24 is engaged to set a forward drive range, that is, to select a route for transmission of the motive power for forward drive or propulsion. The rearward drive brake 25 is engaged to set a rearward drive range, that is, to select a route for transmission of the motive power for rearward drive or propulsion. By releasing both the forward drive clutch 24 and the rearward drive brake 25, a neutral range can be set.

As explained in connection with FIG. 1, the foregoing continuously variable transmission mechanism 10 includes a drive pulley 5 and a driven pulley 8, pulley widths of which can be changed by means of an oil pressure, etc., and a metal V-belt 7 spanning between the drive pulley 5 and the driven pulley 8 so that the reduction or shift ratio can be changed continuously by altering the pulley widths.

Like the CVT of FIG. 1, the CVT 1 shown in FIG. 2 may further include a startoff clutch between the counter shaft 3 of the driven pulley 8 and the differential mechanism 29.

Figure 3:
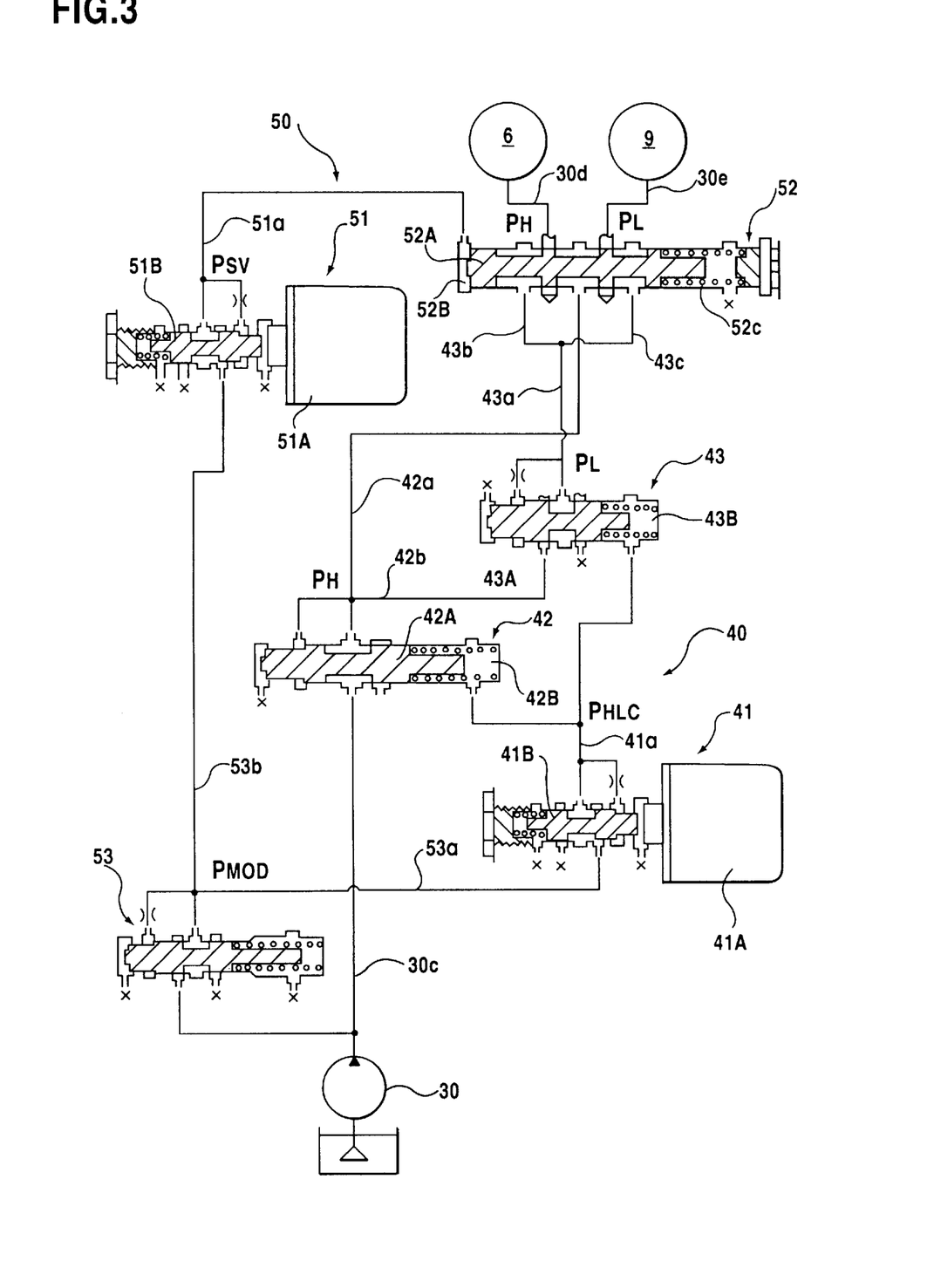
FIG. 3 is a diagrammatic view illustrating the oil pressure circuitry arrangement of a pulley lateral pressure control valve and a shift ratio control valve.

FIG. 3 illustrates how the pulley lateral pressure control valve 40 and the shift ratio control valve 50, shown in FIG. 1, are arranged. As shown in FIG. 3, the pulley lateral pressure control valve 40 is comprised of a high-low pressure control valve 41, a high pressure regulator valve 42 and a low pressure regulator valve 43. The shift ratio control valve 50 has a shift control valve 51 and a shift valve 52.

Reference numeral 53 designates a reducing valve which regulates an oil fed from an oil pressure pump 30 through an oil passage into a line pressure PMOD of substantially constant oil pressure and supplies the actuating oil with the line pressure to the high-low control valve 41 through the oil passage 53a and to the shift control valve 51 of the shift ratio control valve 50 through the oil passage 53b. The portions marked "x" are connected to drains not shown.

The high-low control valve 41 includes a linear solenoid 41A and, by controlling a pressing force acting upon a spool 41B by the solenoid current $I_{SP}$ (see FIG. 1) supplied from the controller 60 (see FIG. 1), regulates the line pressure $P_{MOD}$ supplied from the oil passage 53a by movement of the spool 41B. Thereafter, it generates a control back pressure $P_{HLC}$ corresponding to the regulated pressing force for subsequent feeding to the high pressure regulator valve 42 and the low pressure regulator valve 43 through an oil passage 41a.

The high pressure regulator valve 42 receives in an oil chamber 42B at a right end thereof the control back pressure $P_{HLC}$ supplied from the high-low control valve 41, converts the actuating oil pressure supplied from the oil pressure pump 30 through an oil passage 30c into a high lateral pressure control pressure $P_H$ corresponding to the control back pressure $P_{HLC}$ by moving the spool 42A via a pressing force corresponding to the control back pressure $P_{HLC}$, and supplies the high lateral pressure control pressure $P_H$ through an oil passage 42a to the shift valve 52 of the shift ratio control valve 50 and through an oil passage 42b to the low pressure regulator valve 43.

The low-pressure regulator valve 43 receives in an oil chamber 43B at a right end thereof the control back pressure $P_{HLC}$ supplied from the high-low control valve 41, regulates a high lateral pressure control pressure $P_H$ supplied from the high pressure regulator valve 42 to convert the same into a low lateral pressure control pressure $P_L$, and supplies the low lateral pressure control pressure $P_L$ through oil passages 43b and 43c branched off from an oil passage 43a to the shift valve 52 of the shift ratio control valve 50.

The shift control valve 51 includes a linear solenoid 51A and regulates, by controlling a pressing force acting upon a spool 51B by solenoid current $I_{SC}$ (see FIG. 1) supplied from the controller 60 (FIG. 1), the line pressure $P_{MOD}$ supplied from oil passage 53b through movement of the spool 51B, and supplies a shift control pressure $P_{SV}$ corresponding to the regulated pressing force to the shift valve 52 through an oil passage 51a.

The shift valve 52 receives with an oil chamber 52B at a left end thereof the shift control pressure $P_{SV}$ supplied from the shift control valve 51 and moves a spool 52A by means of the pressing force corresponding to the shift control pressure $P_{SV}$. The spool 52A is normally pressed leftwardly from a right end side by a spring 52C and is moved to a position where the shift control pressure $P_{SV}$ from the left end oil chamber 52B and the pressing force of the spring 52C are counterbalanced. Thus, positional control of the spool 52A is performed by controlling the shift control pressure $P_{SV}$. As a result, the high lateral pressure control pressure $P_H$ supplied from the high pressure regulator valve 42 and the low lateral pressure control pressure PL supplied from the low pressure regulator valve 43, after being regulated to a predetermined pressure, are supplied to the drive side cylinder chamber 6 of the drive pulley 5 and to the driven side cylinder chamber 9 of the driven pulley 8 to thereby cause the shift ratio control valve 50 to effect the shift ratio control of the transmission.

As the shift ratio control is performed with respect to the transmission, the low lateral pressure control pressure $P_L$ fed from the low pressure regulator valve 43 is set so that a most appropriate pulley lateral pressure is established for achieving the desired torque transmission while preventing the slippage of the metal V-belt 7 shown in FIG. 1 and appropriately maintaining the clamping force between the V-belt 7 and the drive pulley 5 or the driven pulley 8.

Figure 4A:
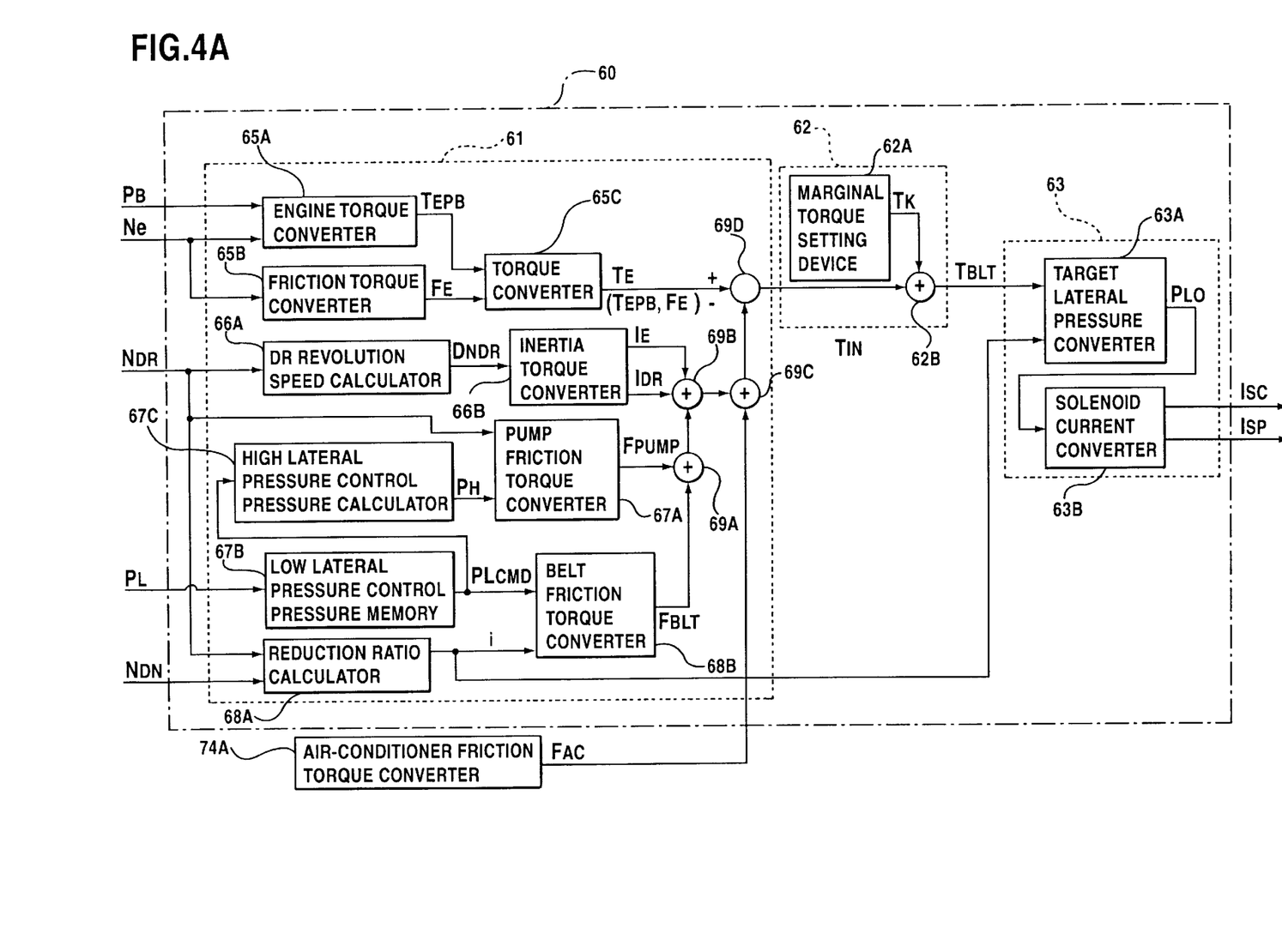
FIG. 4A is a diagrammatic view illustrating a relevant part of a controller of a continuously variable V-belt transmission for use with the embodiment of FIG. 1.

Discussion will now be made as to the arrangement and operation of the controller 60 with reference to FIG. 4A illustrating in block diagram the functions of the controller of the CVT according to the present invention and FIG. 1.

The controller 60 is comprised of a transmission torque calculator 61, a target belt transmission torque calculator 62 and a signal converter 63. The controller 60 performs a torque calculation, conversion and processing based on the revolution number signal Ne relative to the engine (ENG) supplied from the electronic control unit (ECU), an engine intake negative pressure signal $P_B$, a drive pulley revolution number signal $N_{DR}$ detected in respect of the drive pulley 5 by a revolution number sensor 71 and a driven pulley revolution number signal $N_{DN}$ detected in relation to the driven pulley 8 by the revolution number sensor 72 and thereafter supplies a solenoid current $I_{SP}$ to the pulley lateral pressure control valve 40 and a solenoid current $I_{SC}$ to the shift ratio control valve 50.

The transmission torque calculator 61 is comprised of an engine torque converter 65A, a friction torque converter 65B, a torque selector 65C, a DR revolution speed calculator 66A, an inertia torque converter 66B, a pump friction torque converter 67A, a low lateral pressure control pressure memory 67B, a high lateral pressure control pressure calculator 67C, a reduction ratio calculator 68A, a belt friction converter 68B, a plurality of adders 69A, 69B, 69C, and a subtracter 69D.

Figure 7:
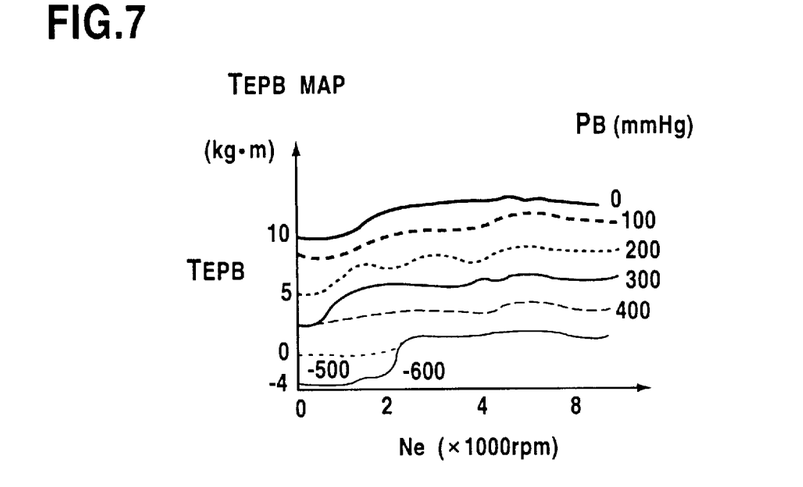
FIG. 7 is a graph illustrating the characteristics ($T_{EPB}$ map) of an engine torque $T_{EPB}$ relative to an engine revolution number signal Ne where an engine intake negative pressure signal $P_B$ is a parameter.

The engine torque converter 65A has a memory such as a ROM, which stores data corresponding to engine torque $T_{EPB}$ characteristics ($T_{EPB}$ map), as shown in FIG. 7, relative to the engine revolution number signal Ne where the engine intake negative pressure signal $P_B$ is a parameter, and converts the engine intake negative pressure signal $P_B$ and the engine revolution number signal Ne into corresponding engine torques $T_{EPB}$ for subsequent feeding to the torque selector 65C.

Figure 8:
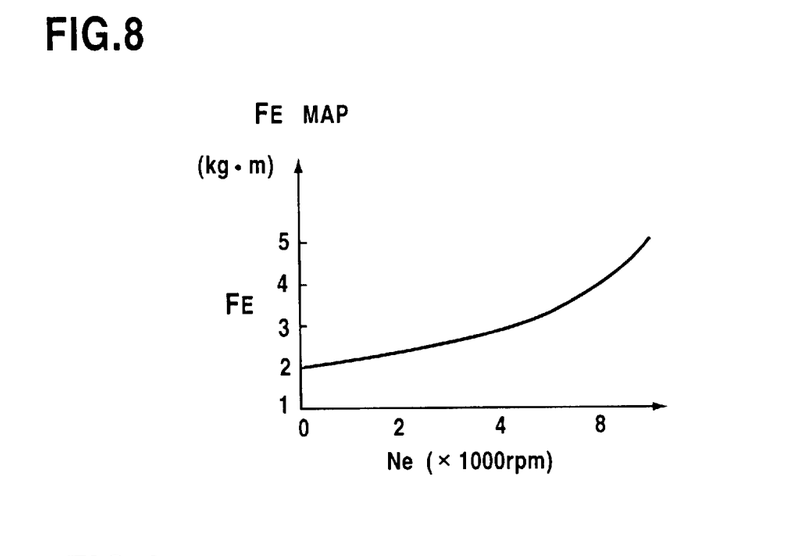
FIG. 8 is a graph illustrating the characteristics ($F_E$ map) of an engine friction torque $F_E$ relative to the engine revolution number signal Ne.

The friction torque converter 65B has a memory such as a ROM, which stores data corresponding to engine friction torque $F_E$ characteristics ($F_E$ map), as shown in FIG. 8, relative to the engine revolution number signal Ne, and converts the engine revolution number signal Ne into a corresponding engine friction torque $F_E$ for subsequent feeding to the torque selector 65C.

The torque selector 65C may be composed, for example, of a software controlled switching device adapted to be controlled based on whether or not fuel supply to the engine is interrupted. The torque selector 65C may be controlled such that the engine torque signal $T_{EPB}$ supplied from the engine torque converter 65A is selected when fuel supply is not interrupted and such that the engine friction torque signal $F_E$ from the friction torque converter 65B is selected when fuel supply is interrupted, so that an output torque signal $T_E$ ($T_{EPB}$, $F_E$) is output toward the subtracter 69D.

The DR revolution number calculator 66A has a differential calculation function, calculates the DR revolution speed from the drive pulley revolution number signal $N_{DR}$ and outputs a DR revolution speed signal $D_{NDR}$ toward the inertia torque converter 66B.

Figure 10:
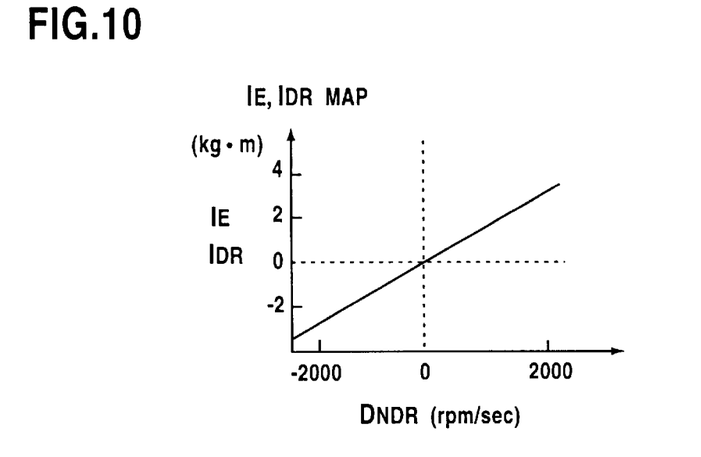
FIG. 10 is a graph illustrating the characteristics ($I_E$, $I_{DR}$ map) of an engine inertia torque $I_E$ and a drive pulley inertia torque $I_{DR}$ relative to a DR revolving speed signal $D_{NDR}$.

The inertia torque converter 66B includes a memory such as a ROM, which stores data corresponding to the engine inertia torque $I_E$ and drive pulley inertia torque $I_{DR}$ characteristics ($I_E$, $I_{DR}$ map), as shown in FIG. 10, relative to the DR revolution speed signal $D_{NDR}$, and converts the DR revolution speed signal $D_{NDR}$ into a corresponding engine inertia torque $I_E$ and into a corresponding drive pulley inertia torque $I_{DR}$, and feeds the inertia torque signal $I_E$ and the inertia torque $I_{DR}$ to the adder 69B.

Figure 11:
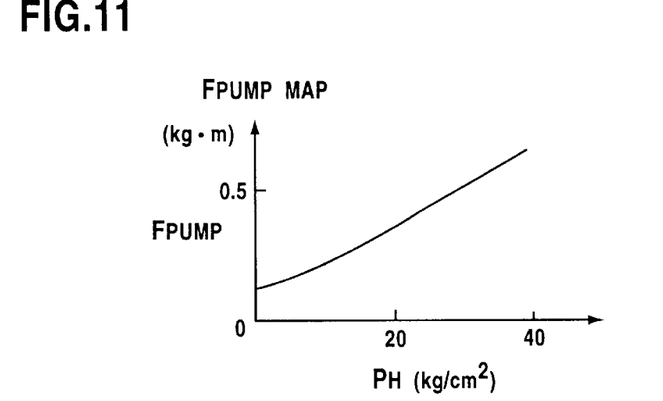
FIG. 11 is a graph illustrating the characteristics ($F_{PUMP}$ map) of a pump friction torque $F_{PUMP}$ relative to a high lateral pressure control pressure signal $P_H$.

The pump friction torque converter 67A includes a memory such as a ROM, which stores data corresponding to pump friction torque $F_{PUMP}$ characteristics, as shown in FIG. 11, relative to the high lateral pressure control pressure signal $P_H$, and generates, based on the drive pulley revolution number signal $N_{DR}$ and high lateral pressure control pressure signal $P_H$ calculated from the previous low lateral pressure control pressure signal $PL_{CMD}$ stored in the low lateral pressure control pressure memory 67B, a pump friction torque $F_{PUMP}$ to be supplied to the adder 69A.

Having a rewritable memory such as a RAM, the low lateral pressure control pressure memory 67B outputs the previously-stored low lateral pressure control pressure signal PLCMD to the high lateral pressure control pressure calculator 67C and the belt friction torque converter 68B every time the low lateral pressure control pressure signal $P_L$ is input and is updated to the current low lateral pressure control pressure $P_L$ value.

With a division function, the reduction ratio calculator 68A calculates a reduction ratio i ($=N_{DR}/N_{DN}$) with respect to the drive pulley revolution number signal $N_{DR}$ and driven pulley revolution number signal $N_{DN}$ and supplies the reduction ratio signal i to the belt friction torque converter 68B and a target lateral pressure converter 63A.

Figure 12:
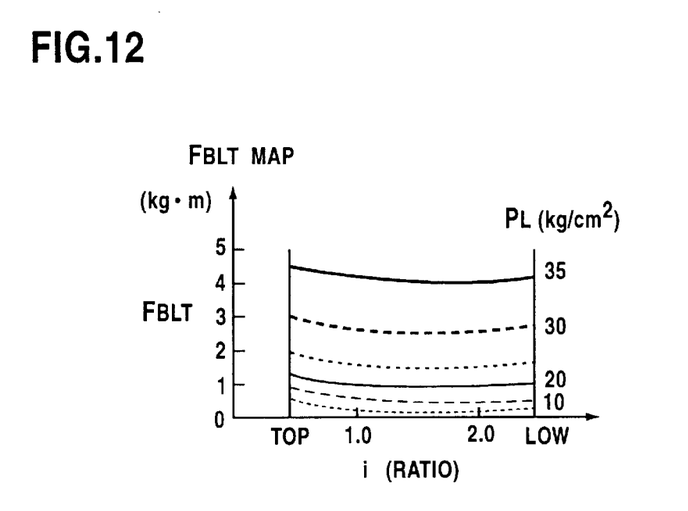
FIG. 12 is a graph illustrating the characteristics ($F_{BLT}$ map) of a belt drive friction torque $F_{BLT}$ relative to a reduction ratio signal i where a low lateral pressure control pressure signal $P_L$ is a parameter.

The belt friction torque converter 68B stores data corresponding to belt friction torque $F_{BLT}$ characteristics ($F_{BLT}$ map), as shown in FIG. 12, relative to the reduction ratio signal i where the low lateral pressure control pressure signal $P_L$ is a parameter and generates a belt friction torque $F_{BLT}$ corresponding to the reduction ratio signal i and supplies the same torque $F_{BLT}$ to the adder 69A.

The adder 69B adds up the added signal ($F_{PUMP}+F_{BLT}$) from the adder 69A, and the inertia torque signals $I_E$ and $I_{DR}$ supplied from the inertia torque converter 66B and supplies a resulting control system friction signal ($F_{PUMP}+F_{BLT}+I_E+I_{DR}$) to the adder 69C.

Figure 9:
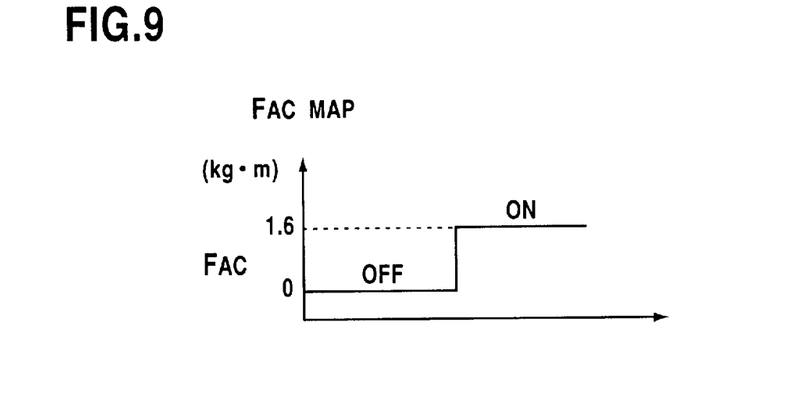
FIG. 9 is a graph illustrating the characteristics of an air-conditioner friction torque $F_{AC}$.

The adder 69C adds up the control system friction signal ($F_{PUMP}+F_{BLT}+I_E+I_{DR}$) and the air-conditioner friction torque signal $F_{AC}$ (see the air-conditioner friction torque $F_{AC}$ characteristics shown in FIG. 9) converted by an air-conditioner friction torque converter 74A of the external air-conditioner actuation detector 74 shown in FIG. 1 and outputs a friction sum signal ($F_{PUMP}+F_{BELT}+I_E+I_{DR}+F_{AC}$) to the subtracter 69D.

The subtracter 69D calculates a deviation ($T_E-F_{PUMP}-F_{BLT}-I_E-I_{DR}-F_{AC}$) between the output torque signal $T_E$ ($T_{EPB}$, $F_E$) output from the torque selector 65C and the friction sum signal ($F_{PUMP}+F_{BLT}+I_E+I_{DR}+F_{AC}$) output from the adder 69C and sends out a transmission torque signal $T_{IN}$ to the the target belt transmission torque calculator 62.

Although three separate adders 69A, 69B and 69C are used in the present embodiment to obtain the friction sum signal ($F_{PUMP}+F_{BLT}+I_E+I_{DR}+F_{AC}$), it is also possible to employ in their stead an OR logic circuit capable of making the five inputs ($F_{PUMP}$, $F_{BLT}$, $I_E$, $I_{DR}$, $F_{AC}$).

Each of the foregoing converters has been described as having a ROM of its own. However, it may also be possible to form the memory of the transmission torque calculator 61 by using a single ROM with plural memory areas each corresponding to the contents of each ROM.

As it may be appreciated from above, the transmission torque calculator 61 calculates a deviation between the output torque signal $T_E$ ($T_{EPB}$, $F_E$) and the friction sum signal ($F_{PUMP}+F_{BLT}+I_E+I_{DR}+F_{AC}$), the former having been obtained by converting, based on the relevant maps, the engine revolution number signal Ne and engine intake negative pressure signal $P_B$ into the engine torque signal $T_{EPB}$ and the engine friction torque signal $F_E$, the latter having been obtained by adding up the engine inertia torque signal $I_E$ obtained by calculation or conversion of the drive pulley revolution number signal $N_{DR}$, and drive pulley inertia torque signal $I_{DR}$, friction torque signal $F_{PUMP}$ and the belt friction torque signal $F_{BLT}$, and outputs a transmission torque signal $T_{IN}(T_F-F_{PUMP}-F_{BLT}-I_E-I_{DR}-F_{AC})$.

The target belt transmission torque calculator 62 has a marginal torque setting device 62A and an adder 62B.

The marginal torque setting device 62A includes a memory such as a ROM, which stores data corresponding to predetermined marginal torque values which are selected upon designing or obtained through experiments, and outputs a marginal torque signal $T_K$ to the adder 62B in timed relation with supply of the transmission torque signal $T_{IN}$ from the subtracter 69D.

Having an adding calculation function, the adder 62B calculates a target belt transmission torque $T_{BLT}$ by adding the transmission torque signal $T_{IN}$ and marginal torque signal $T_K$ and outputs a target belt transmission torque signal $T_{BLT}$ to the signal converter 63.

Figure 4B:
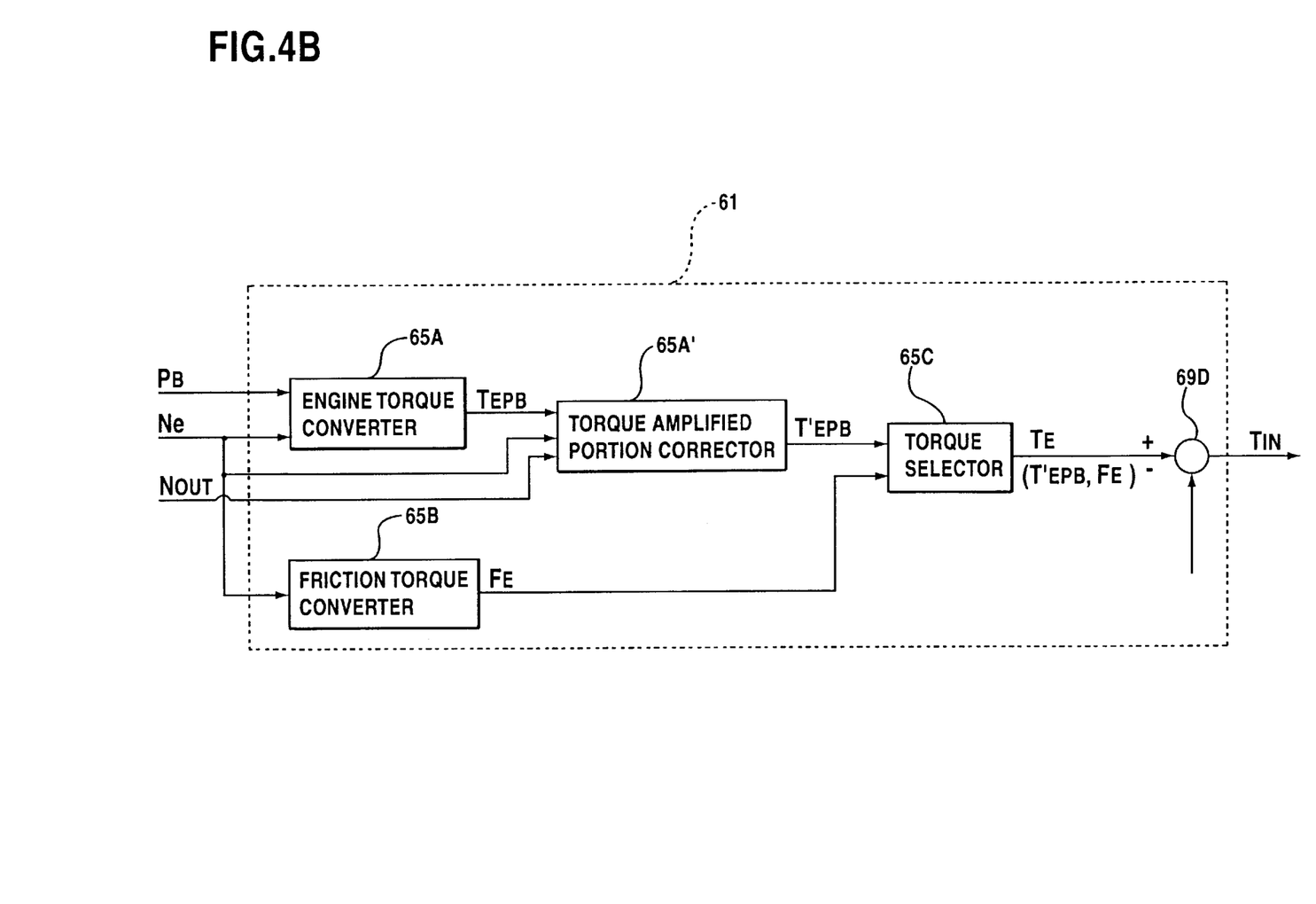
FIG. 4B is a partial block diagram illustrating a main portion of a transmission torque calculator for use with the torque-converter-equipped CVT of FIG. 2.

Reference is now had to FIG. 4B showing in block diagram a main portion of the transmission torque calculator 61 modified to take account of the torque converter 100 shown in FIG. 2.

Between the engine torque converter 65A and the torque selector 65C, there is provided a torque amplified portion corrector 65A' for correcting an amplified portion torque of the torque converter 100 (see FIG. 2).

Figure 13:
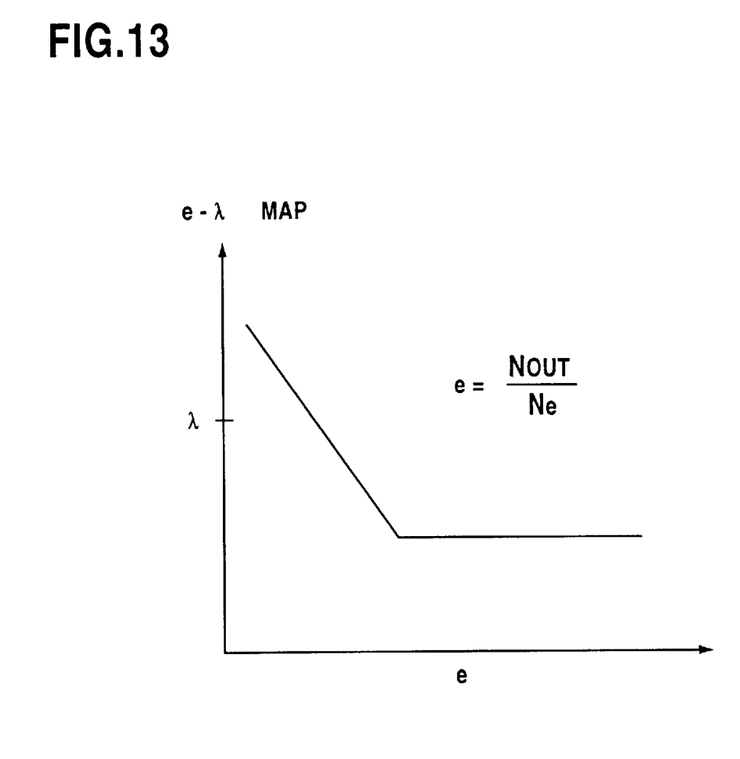
FIG. 13 is a graph illustrating the characteristics (e–λ map) of a torque ratio λ relative to an output revolution ratio e of the torque converter.

The torque amplified portion corrector 65A' stores in a memory such as a ROM thereof data corresponding to the characteristics (e–λ map), as shown in FIG. 13, indicative of the relationships between the output revolution ratio e, which is a ratio of the output revolution number signal $N_{OUT}$ of the torque converter 100 of FIG. 2 and the engine revolution number signal Ne, and the torque ratio λ, corrects the engine torque signal $T_{EPB}$ based on the torque ratio from the map, and supplies a corrected engine torque $T'_{EPB}$ to a torque selector 65C.

Figure 5:
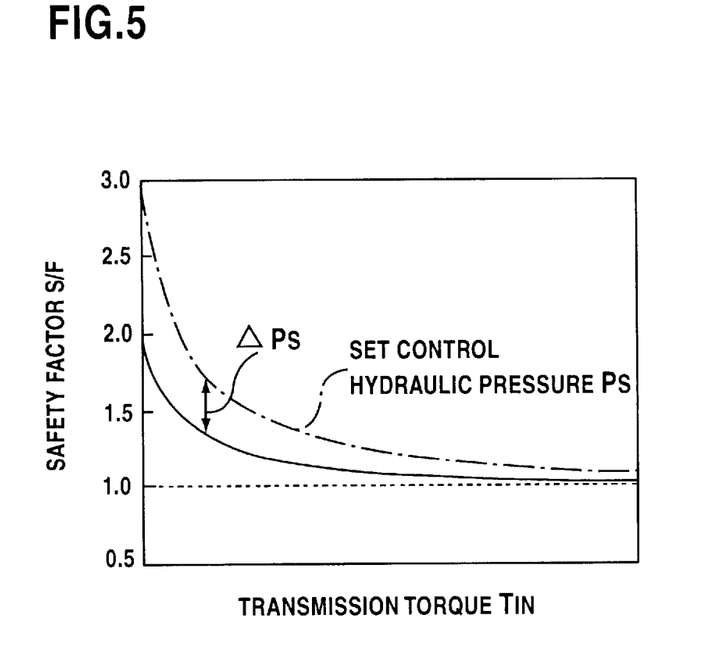
FIG. 5 is a graph illustrating the characteristics of OD low load condition/transmission torque ($T_{IN}$) upon setting of marginal torque $T_K$ of predetermined value-safety factor (S/F)

FIG. 5 shows characteristics relative to OD low load condition/transmission torque ($T_{IN}$) upon setting of a marginal torque $T_N$ of predetermined value—safety factor (S/F). Similarly, FIG. 6 shows characteristics relative to LOW ratio high load condition/transmission torque ($T_{IN}$) upon setting of a marginal torque $T_K$ of predetermined value—marginal control oil pressure ($P_K$).

Referring to FIG. 5, a marginal torque $T_K$ of predetermined value is set to become more than 1 (solid line characteristics) over an entire OD low load area even when the safety factor S/F characteristics (shown by a dash-and-dot line), which correspond to the control pressure $P_S$ (pulley lateral pressure control oil pressure $P_L$, $P_H$) upon nominal setting with respect to the transmission torque $T_{IN}$, undergo a maximum change ($\Delta P_S$) toward a low pressure side by dispersion associated with the secular change and/or environmental change of the control oil pressure $P_S$. By thus setting the marginal torque $T_K$ of predetermined value, slippage of the belt on the OD low load side can be prevented completely.

Figure 6:
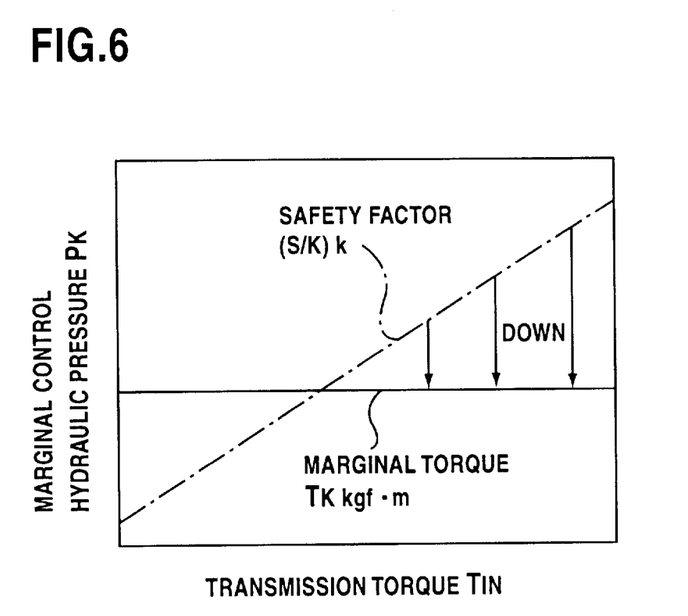
FIG. 6 is a graph illustrating the characteristics of LOW high load condition/transmission torque (TIN) upon setting of marginal torque of predetermined value $T_K$-marginal control oil pressure ($P_K$)

As shown in FIG. 6, by setting the marginal torque $T_K$ of predetermined value, it becomes possible to set the marginal control oil pressure $P_K$ of the control oil pressure $P_S$ (pulley lateral pressure control oil pressure $P_L$, $P_H$) at a predetermined value over the entire LOW ratio high load area (transmission torque $T_{IN}$) and to provide a less variable, more appropriate clamping force compared to that provided by the marginal control oil pressure $P_K$ (shown by a dash-and-dot line) produced by the conventional continuously variable belt transmission in which the transmission torque $T_{IN}$ is multiplied by a predetermined safety factor $(S/F)_K$.

Turning back to FIG. 4, the signal converter 63 has a target lateral pressure converter 63A and a solenoid current converter 63B.

The target lateral pressure converter 63A converts the belt transmission torque signal $T_{BLT}$ into a control signal (target lateral pressure signal $P_{LO}$) required for the control of the pulley lateral pressure control valve 40 and the shift ratio control valve 50 (see FIG. 1) and outputs the same to the solenoid current converter 63B.

The solenoid current converter 63B has a memory such as a ROM and converts the target lateral pressure signal $P_{LO}$ into a solenoid current signal $I_{SP}$, $I_{SC}$ for driving the linear solenoid 41A and linear solenoid 51A, and outputs the solenoid current $I_{SP}$, $I_{SC}$ through a current drive circuit not shown.

As thus far explained, the continuously variable V-belt transmission according to the present invention includes the controller having the target belt transmission torque calculator composed of the marginal torque setting device and the adder so that the target transmission torque can be calculated by adding the marginal torque to the transmission torque. As a result, it becomes possible to generate a most appropriate lateral pressure controlling oil pressure based on the target transmission torque, to prevent slippage of the belt on the low load OD ratio side and to provide a most appropriate clamping force on the high load LOW ratio side.

The present invention thus provides a highly reliable, durable and fuel-consumption efficient CVT with the pulley lateral pressure control valve adapted to cause no slippage between the belt and the pulleys and being capable of producing a most appropriate clamping force notwithstanding secular and environmental changes of the lateral pressure control oil pressure.

In the continuously variable V-belt transmission having the torque converter as shown in FIG. 2, the engine torque $T_{EPB}$ of the engine torque converter 65A shown in FIG. 4B is subjected to a torque correction by a torque amplified portion corrector 65A' and then to a torque selection by a torque selector 65C and thereafter to the calculation by the marginal torque setting device 62A (see FIG. 4A), whereby the same results can be achieved as in the CVT without such torque converter.

Obviously, various minor changes and modifications of the present invention are possible in the light of the above teaching. It is therefore to be understood that within the scope of the appended claims, the invention may be practiced otherwise than as specifically described.

What is claimed is:

1. A continuously variable V-belt transmission comprising a drive pulley connected to an input shaft, a driven pulley connected to an output shaft, a V-belt spanning between said drive pulley and said driven pulley, a drive side cylinder for setting a width of said drive pulley, a driven side cylinder for setting a width of said driven pulley, a lateral pressure control valve for controlling a lateral pressure control oil pressure of an oil supplied to said drive side cylinder and said driven side cylinder, and a controller for controlling said lateral pressure control valve, wherein said controller comprises:

a transmission torque calculator for calculating a transmission torque based on a signal detected from a drive condition;

a target belt transmission torque calculator for calculating a target belt transmission torque by adding a designed marginal torque of predetermined value to said transmission torque; and a signal converter for generating a control signal for driving said lateral pressure control valve based on said target belt transmission torque, whereby said lateral pressure control oil pressure is generated in a most appropriate form based on said target belt transmission torque.

2. A continuously variable V-belt transmission according to claim 1, wherein said target belt transmission torque calculator is comprised of a marginal torque setting device for setting a marginal torque of predetermined value and a calculator for calculating said target belt transmission torque by adding said marginal torque to said transmission torque.

3. A continuously variable V-belt transmission according to claim 1, wherein said signal converter is comprised of a target lateral pressure converter for converting said target belt transmission torque into a control signal for generating a pulley lateral pressure and a solenoid current converter for converting said control signal into a solenoid current signal for driving a solenoid.

* * * * *